US010823035B2

(12) United States Patent
Maeda et al.

(10) Patent No.: US 10,823,035 B2
(45) Date of Patent: Nov. 3, 2020

(54) EXHAUST PURIFICATION DEVICE FOR INTERNAL COMBUSTION ENGINE AND METHOD FOR CONTROLLING THE DEVICE

(71) Applicant: TOYOTA JIDOSHA KABUSHIKI KAISHA, Toyota-shi, Aichi-ken (JP)

(72) Inventors: Naoki Maeda, Anjo (JP); Masanao Idogawa, Nagoya (JP); Noriyasu Kobashi, Hachioji (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 15 days.

(21) Appl. No.: 16/207,433

(22) Filed: Dec. 3, 2018

(65) Prior Publication Data

US 2019/0178142 A1     Jun. 13, 2019

(30) Foreign Application Priority Data

Dec. 11, 2017    (JP) ................................. 2017-236986

(51) Int. Cl.
*F01N 9/00*      (2006.01)
*F01N 3/025*     (2006.01)
(Continued)

(52) U.S. Cl.
CPC ............. *F01N 9/002* (2013.01); *F01N 3/021* (2013.01); *F01N 3/0253* (2013.01); *F01N 9/005* (2013.01);
(Continued)

(58) Field of Classification Search
CPC ........... F01N 11/002; F01N 2900/1406; F01N 2900/1606; F01N 9/002
See application file for complete search history.

(56) References Cited

U.S. PATENT DOCUMENTS

| | | | |
|---|---|---|---|
| 8,966,882 B2 * | 3/2015 | Tylutki | F01N 11/002 60/277 |
| 2008/0215205 A1 * | 9/2008 | Kariya | F01N 11/002 701/31.4 |

(Continued)

FOREIGN PATENT DOCUMENTS

| | | |
|---|---|---|
| JP | 2004-197722 | 7/2004 |
| JP | 2008-057443 | 3/2008 |

*Primary Examiner* — Anthony Ayala Delgado
(74) *Attorney, Agent, or Firm* — Finnegan, Henderson, Farabow, Garrett & Dunner, LLP

(57) ABSTRACT

An exhaust purification device includes a PM filter and a differential pressure sensor for the PM filter, and calculates a first estimated amount PMf based on the operating state of the internal combustion engine and a second estimated amount PMc based on the differential pressure. The exhaust purification device performs an anomaly determination of the differential pressure sensor based on the state of the differential pressure sensor from stopping of the internal combustion engine to a startup thereof, and corrects the first estimated amount PMf based on the second estimated amount PMc when starting the internal combustion engine. The exhaust purification device calculates, as the PM deposition amount Pr, the larger value of the first and second estimated amounts, and starts a filter regeneration control of the PM filter when the PM deposition amount Pr is equal to or more than a first predetermined amount.

7 Claims, 6 Drawing Sheets

(51) Int. Cl.
*F01N 3/021* (2006.01)
*B01D 46/00* (2006.01)
*F01N 11/00* (2006.01)

(52) U.S. Cl.
CPC .......... *F01N 11/002* (2013.01); *B01D 46/006* (2013.01); *B01D 2279/30* (2013.01); *F01N 2560/08* (2013.01); *F01N 2900/1406* (2013.01); *F01N 2900/1606* (2013.01)

(56) References Cited

U.S. PATENT DOCUMENTS

| | | | |
|---|---|---|---|
| 2019/0017427 A1* | 1/2019 | Dudar | F01N 11/00 |
| 2019/0048777 A1* | 2/2019 | Rollinger | F01N 3/021 |
| 2019/0078524 A1* | 3/2019 | Suchta | B60W 20/16 |

* cited by examiner

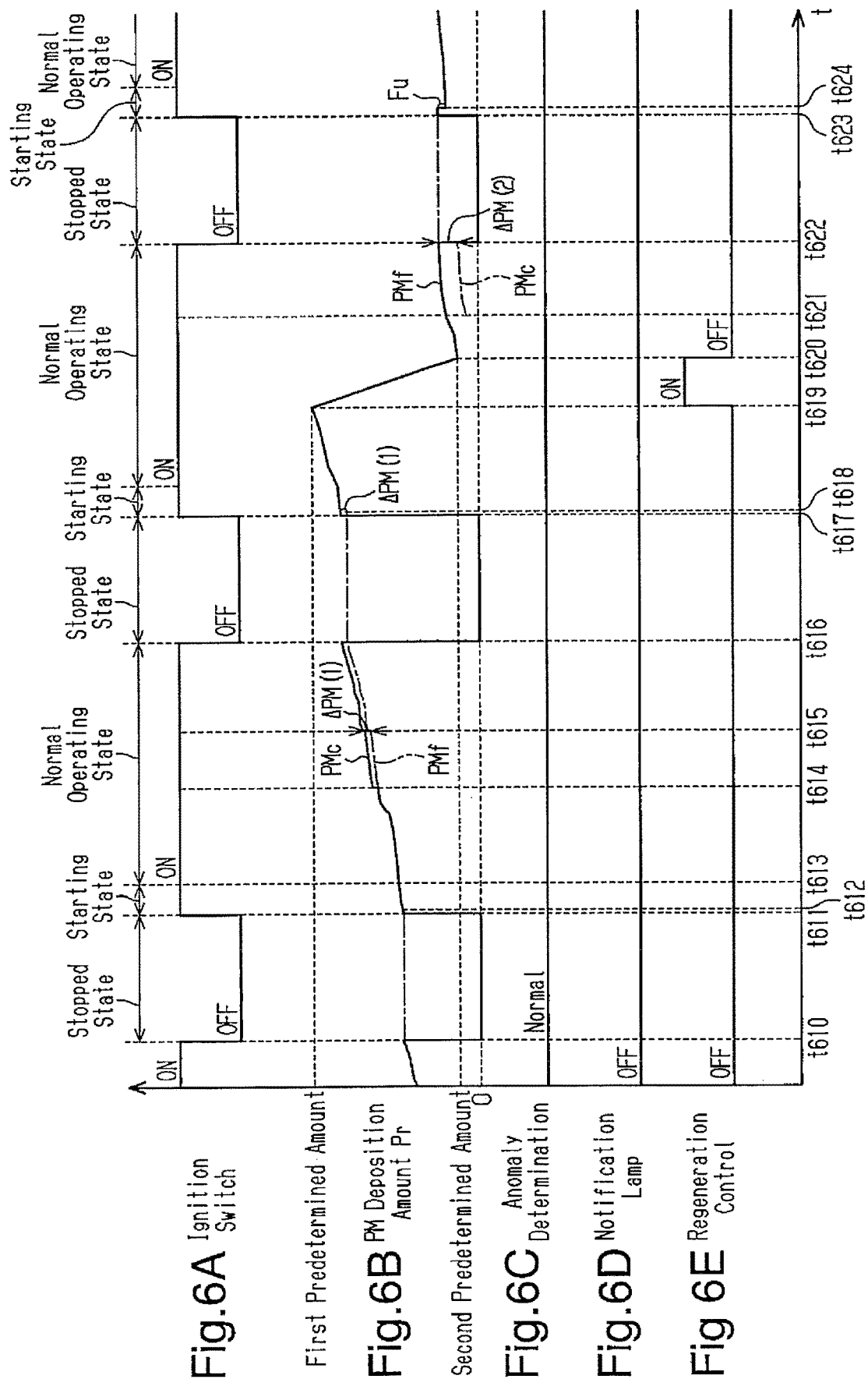

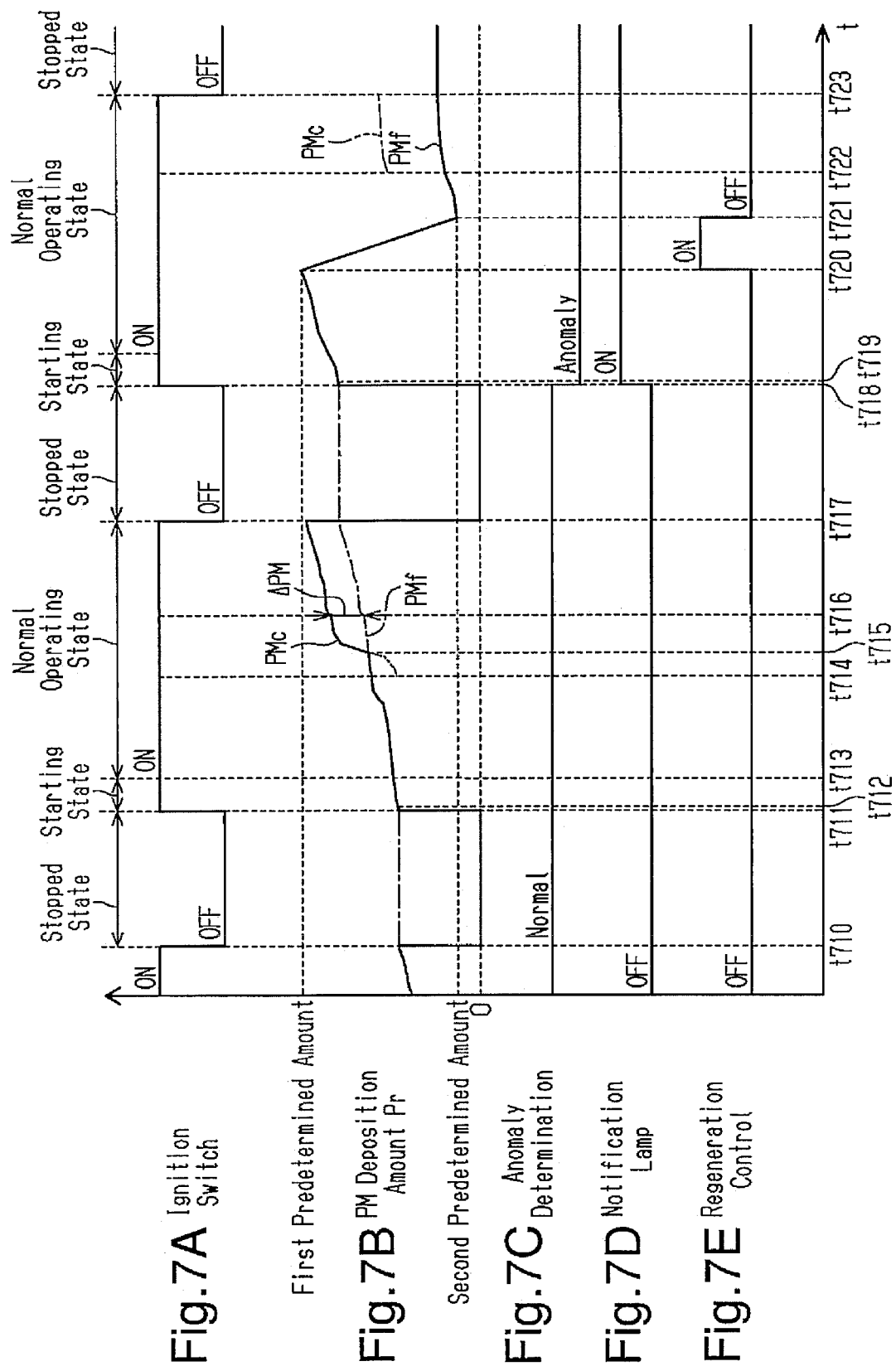

EXHAUST PURIFICATION DEVICE FOR INTERNAL COMBUSTION ENGINE AND METHOD FOR CONTROLLING THE DEVICE

BACKGROUND

The present disclosure relates to an exhaust purification device for an internal combustion engine and a method for controlling the exhaust purification device.

An exhaust purification device for an internal combustion engine described in Japanese Laid-Open Patent Publication No. 2004-197722 has a PM filter and a differential pressure sensor. The PM filter traps particulate matter (hereinafter referred to as PM) contained in exhaust gas flowing through an exhaust passage. The differential pressure sensor detects the pressure difference between the upstream side and the downstream side of the PM filter. The exhaust purification device calculates a first estimated amount as an estimated amount of PM deposited in the PM filter based on the operating state of the internal combustion engine. Further, the exhaust purification device calculates a second estimated amount as an estimated amount of PM deposited in the PM filter based on the differential pressure of the PM filter detected by the differential pressure sensor. The exhaust purification device calculates the larger value of the first estimated amount and the second estimated amount as the PM deposition amount, which is the deposition amount of PM deposited on the PM filter. In the exhaust purification device described in this document, when the PM deposition amount is equal to or more than a predetermined amount, regeneration control for removing the PM trapped in the PM filter is started. By raising the temperature of the exhaust gas by the regeneration control, the PM trapped in the PM filter is burned and removed.

Similarly to the above, the exhaust purification device for an internal combustion engine described in Japanese Laid-Open Patent Publication No. 2008-057443 calculates a first estimated amount and a second estimated amount. The exhaust purification device calculates a first estimated amount corrected based on the second estimated amount as a PM deposition amount and utilizes the PM deposition amount for the regeneration control of the PM filter.

However, if an anomaly occurs in the differential pressure sensor, the value of the second estimated amount calculated based on a detection signal of the differential pressure sensor may not reach a value corresponding to the actual PM deposition amount. In this case, if the first estimated amount is corrected based on the second estimated amount, the calculation accuracy of the PM deposition amount decreases. This feature is not disclosed in Japanese Laid-Open Patent Publication No. 2004-197722 or Japanese Laid-Open Patent Publication No. 2008-057443.

SUMMARY

In accordance with a first aspect of the present disclosure, an exhaust purification device for an internal combustion engine is provided. The exhaust purification device includes an exhaust passage, from which exhaust gas from the internal combustion engine is discharged, a PM filter provided in the exhaust passage and configured to trap PM contained in the exhaust gas, and a differential pressure sensor configured to detect a differential pressure between an upstream side and a downstream side of the PM filter. The exhaust purification device is configured to: calculate a first estimated amount as an estimated amount of PM deposited in the PM filter based on an operating state of the internal combustion engine; calculate a second estimated amount as an estimated amount of PM deposited in the PM filter based on a differential pressure detected by the differential pressure sensor; perform an anomaly determination of the differential pressure sensor based on a state of the differential pressure sensor in a period from stopping of the internal combustion engine to a startup thereof; when starting the internal combustion engine, execute a correction process to correct the first estimated amount based on the second estimated amount; calculate, as a PM deposition amount, the larger value of the first estimated amount and the second estimated amount; and start a filter regeneration control for burning and removing PM trapped in the PM filter when the PM deposition amount is equal to or more than a predetermined amount.

In accordance with a second aspect of the present disclosure, an exhaust purification device for an internal combustion engine is provided. The exhaust purification device includes an exhaust passage, from which exhaust gas from the internal combustion engine is discharged, a PM filter provided in the exhaust passage and configured to trap PM contained in the exhaust gas, and a differential pressure sensor configured to detect a differential pressure between an upstream side and a downstream side of the PM filter. The exhaust purification device includes circuitry configured to: calculate a first estimated amount as an estimated amount of PM deposited in the PM filter based on an operating state of the internal combustion engine; calculate a second estimated amount as an estimated amount of PM deposited in the PM filter based on a differential pressure detected by the differential pressure sensor; perform an anomaly determination of the differential pressure sensor based on a state of the differential pressure sensor in a period from stopping of the internal combustion engine to a startup thereof; when starting the internal combustion engine, execute a correction process to correct the first estimated amount based on the second estimated amount; calculate, as a PM deposition amount, the larger value of the first estimated amount and the second estimated amount; and start a filter regeneration control for burning and removing PM trapped in the PM filter when the PM deposition amount is equal to or more than a predetermined amount.

In accordance with a third aspect of the present disclosure, a method for controlling an exhaust purification device for an internal combustion engine is provided. The exhaust purification device includes an exhaust passage, from which exhaust gas from the internal combustion engine is discharged, a PM filter provided in the exhaust passage and configured to trap PM contained in the exhaust gas, and a differential pressure sensor configured to detect a differential pressure between an upstream side and a downstream side of the PM filter. The method includes: calculating a first estimated amount as an estimated amount of PM deposited in the PM filter based on an operating state of the internal combustion engine; calculating a second estimated amount as an estimated amount of PM deposited in the PM filter based on a differential pressure detected by the differential pressure sensor; performing an anomaly determination of the differential pressure sensor based on a state of the differential pressure sensor in a period from stopping of the internal combustion engine to a startup thereof; when starting the internal combustion engine, executing a correction process to correct the first estimated amount based on the second estimated amount; calculating, as a PM deposition amount, the larger value of the first estimated amount and the second estimated amount; and starting a filter regeneration control for burning and removing PM trapped in the PM filter when the PM deposition amount is equal to or more than a predetermined amount.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIGS. 6A to 6E are timing diagrams illustrating movements of each parameter in accordance with changes in the operating state of the internal combustion engine when the differential pressure sensor is normal; and FIGS. 7A to 7E are timing diagrams showing movements of each parameter in accordance with changes in the operating state of the internal combustion engine when an anomaly occurs in the differential pressure sensor.

DETAILED DESCRIPTION

An exhaust purification device for an internal combustion engine according to a embodiment will be described with reference to FIGS. 1 to 7E. In the present embodiment, an example in which an exhaust purification device is applied to a gasoline engine as an internal combustion engine will be described.

Figure 1:
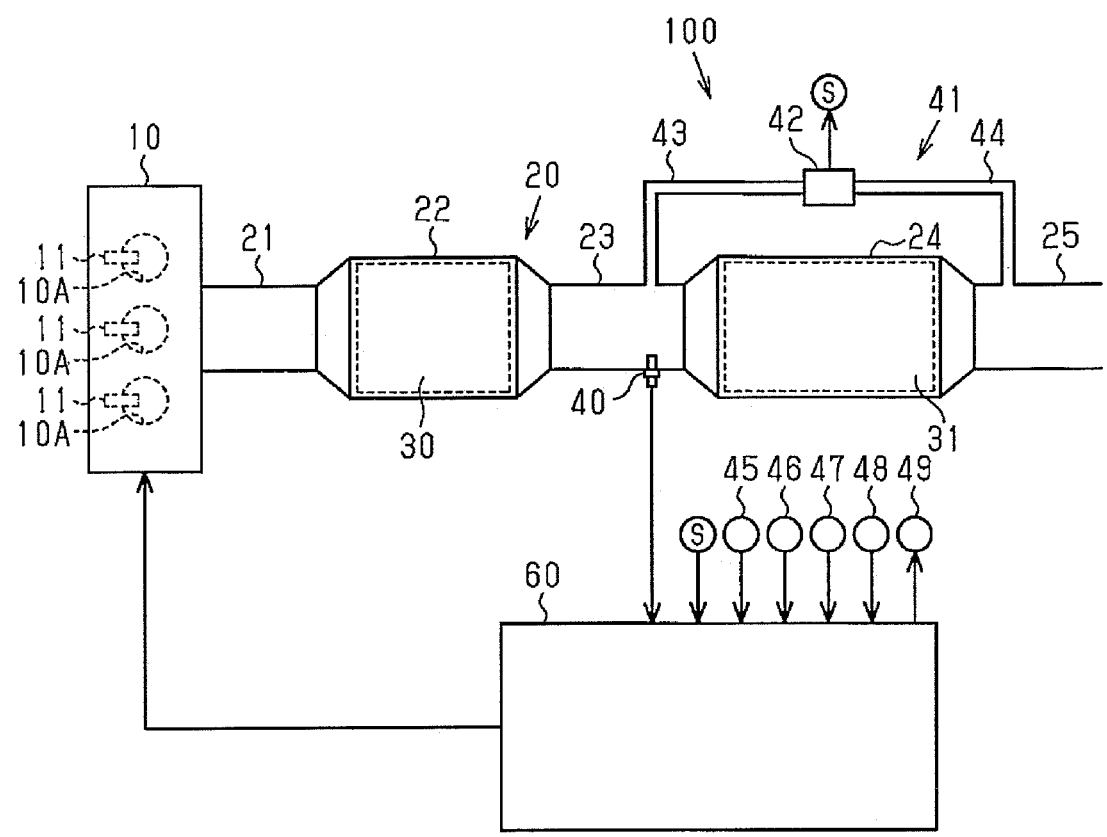
FIG. 1 is a schematic diagram illustrating the configuration of an exhaust purification device for an internal combustion engine.

As shown in FIG. 1, the internal combustion engine includes an engine main body 10 provided with a plurality of combustion chambers 10A. The engine main body 10 is provided with fuel injection valves 11 for supplying fuel to the respective combustion chambers 10A. One fuel injection valve 11 is provided in each combustion chamber 10A. The internal combustion engine is provided with an exhaust purification device 100 having an exhaust passage 20 connected to the engine main body 10. In the exhaust passage 20, exhaust gas is discharged from the combustion chamber 10A. The exhaust passage 20 has a first exhaust pipe 21 connected to the engine main body 10 and a first catalytic converter 22 connected to the downstream end of the first exhaust pipe 21. Inside the first catalytic converter 22, an oxidation catalyst 30 is provided. The oxidation catalyst 30 oxidizes hydrocarbon (HC) and carbon monoxide (CO) contained in the exhaust gas to generate water and carbon dioxide.

The downstream end of the first catalytic converter 22 is connected to a second exhaust pipe 23. In the second exhaust pipe 23, an exhaust gas temperature sensor 40 configured to detect the temperature of the exhaust gas is provided. The downstream end of the second exhaust pipe 23 is connected to a second catalytic converter 24. Inside the second catalytic converter 24, a PM filter 31 is provided. The PM filter 31 traps the PM contained in the exhaust gas. The downstream end of the second catalytic converter 24 is connected to a third exhaust pipe 25.

In the exhaust passage 20, a differential pressure sensor 41 is provided. The differential pressure sensor 41 has an exhaust differential pressure detection unit 42 and an upstream side detection passage 43 and a downstream side detection passage 44 connected to the exhaust differential pressure detection unit 42. The upstream side detection passage 43 is connected to the second exhaust pipe 23 between the oxidation catalyst 30 and the PM filter 31. Therefore, the exhaust gas flowing between the oxidation catalyst 30 and the PM filter 31 flows into the upstream side detection passage 43. Further, the downstream side detection passage 44 is connected to the third exhaust pipe 25 on the downstream side of the PM filter 31. Therefore, the exhaust gas that has passed through the PM filter 31 flows into the downstream side detection passage 44. The pressure in the exhaust passage 20 on the upstream side of the PM filter 31 acts through the upstream side detection passage 43 to the exhaust differential pressure detection unit 42. Further, pressure in the exhaust passage 20 on the downstream side of the PM filter 31 acts through the downstream side detection passage 44 to the exhaust differential pressure detection unit 42. The exhaust differential pressure detection unit 42 detects a differential pressure $\Delta P$, which is the difference between these pressures. Further, the exhaust purification device 100 has a notification lamp 49.

The exhaust purification device 100 has a control device 60. Detection signals from the exhaust gas temperature sensor 40 and the exhaust differential pressure detection unit 42 of the differential pressure sensor 41 are input to the control device 60. Further, output signals from an accelerator sensor 45 configured to detect the operation amount of the accelerator pedal, a rotational speed sensor 46 configured to detect engine rotational speed NE which is the rotational speed of the output axis of the internal combustion engine, an ignition switch 47, and an air flow meter 48 configured to detect an intake air amount Ga supplied to the engine main body 10 are input to the control device 60. The control device 60 includes a CPU, a ROM, and a RAM. By executing the program stored in the ROM by the CPU, the control device 60 executes a filter regeneration control, a correction process for burning and removing the PM trapped in the PM filter 31.

Figure 2:
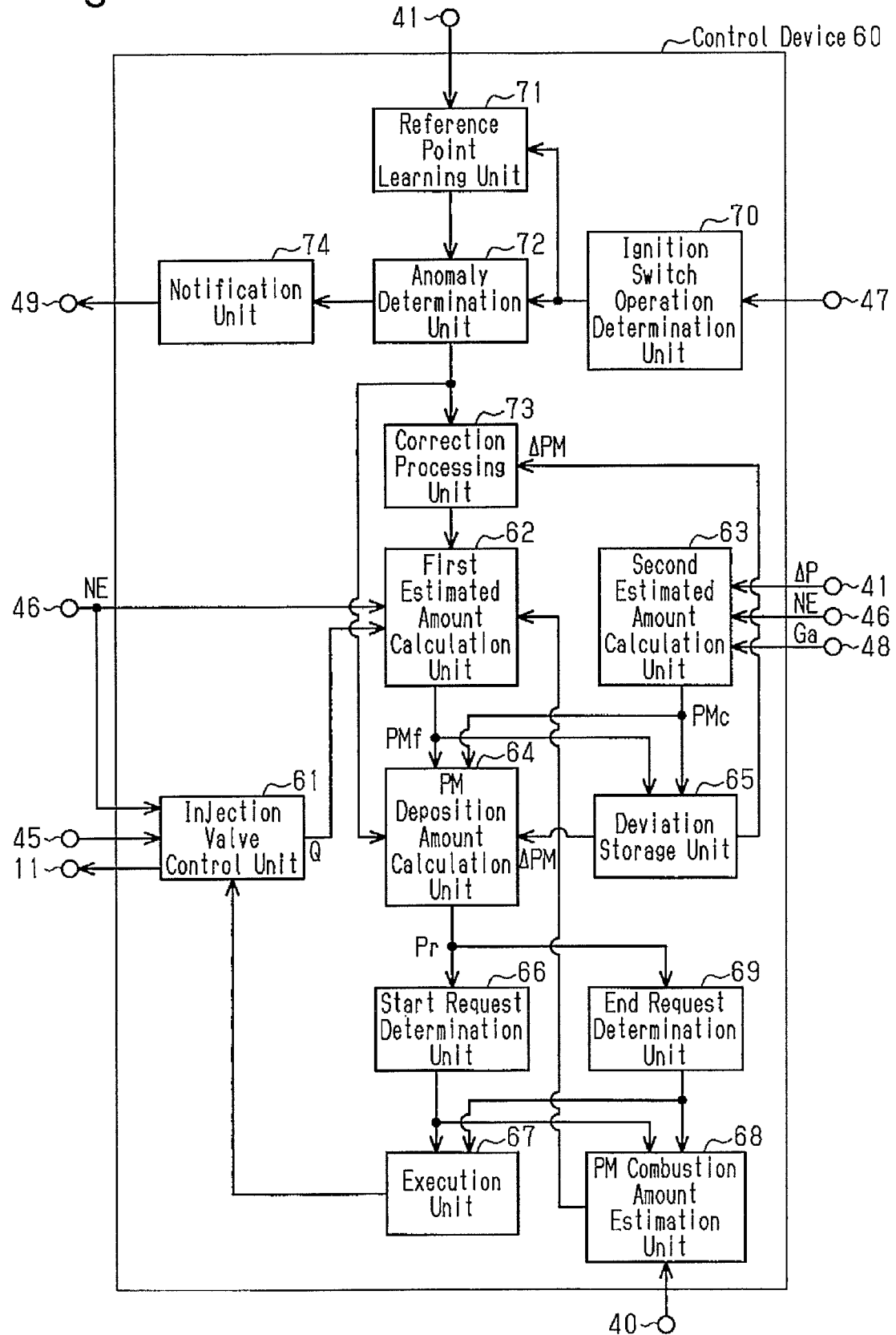
FIG. 2 is a functional block diagram of a control device.

As shown in FIG. 2, the control device 60 has an injection valve control unit 61, a first estimated amount calculation unit 62, a second estimated amount calculation unit 63, a PM deposition amount calculation unit 64, a deviation storage unit 65, a start request determination unit 66, an execution unit 67, a PM combustion amount estimation unit 68, and an end request determination unit 69. Further, the control device 60 has an ignition switch operation determination unit 70, a reference point learning unit 71, an anomaly determination unit 72, a correction processing unit 73, and a notification unit 74.

Based on the output signals from the accelerator sensor 45 and the rotational speed sensor 46, the injection valve control unit 61 calculates a target fuel injection amount Q which is a target value of the amount of fuel to be injected from the fuel injection valve 11. Then, the injection valve control unit 61 controls the fuel injection valve 11 so that the fuel of the calculated target fuel injection amount Q is injected. When the target fuel injection amount Q is larger than the fuel amount that corresponds to a theoretical air fuel ratio, the fuel in the combustion chamber 10A is not completely burned and the exhaust gas containing unburned fuel is discharged to the first exhaust pipe 21 of the exhaust passage 20.

The first estimated amount calculation unit 62 calculates a first estimated amount PMf as an estimated amount of PM deposited in the PM filter 31 based on the operating state of the internal combustion engine. The first estimated amount calculation unit 62 first calculates the PM discharge amount that is the estimated amount of PM discharged from the engine main body 10 to the exhaust passage 20 per unit time based on the engine rotational speed NE detected by the rotational speed sensor 46 and the target fuel injection amount Q calculated by the injection valve control unit 61. The larger the target fuel injection amount Q is, the larger the amount of PM contained in the exhaust gas becomes. Further, as the engine rotational speed NE increases, the amount of exhaust gas discharged per unit time increases, and thus, the amount of PM discharged to the exhaust passage 20 per unit time increases. In this way, the amount of PM contained in the exhaust gas varies depending on the operating state of the internal combustion engine. In the first estimated amount calculation unit 62, a map illustrating the relationship between the engine rotational speed NE, the target fuel injection amount Q, and the PM discharge amount is stored. This map is previously obtained by experiment and simulation. The first estimated amount calculation unit 62 adds up the calculated PM discharge amount per unit time so as to calculate the first estimated amount PMf. During the execution of the filter regeneration control, the first estimated amount calculation unit 62 subtracts the PM combustion amount calculated by the PM combustion amount estimation unit 68 from the integrated value of the PM discharge amount.

Based on the differential pressure $\Delta P$ detected by the differential pressure sensor 41, the second estimated amount calculation unit 63 calculates a second estimated amount PMc as an estimated amount of PM deposited in the PM filter 31. When PM is deposited in the PM filter 31, the pressure loss in the exhaust passage 20 changes. That is, as the amount of PM deposited in the PM filter 31 increases, the pressure of the exhaust gas in the exhaust passage 20 on the upstream side of the PM filter 31 increases. In this manner, the differential pressure $\Delta P$ of the PM filter 31 in the exhaust passage 20 has a correlation with the amount of PM deposited in the PM filter 31. The differential pressure $\Delta P$ also reflects the change in flow rate of the exhaust gas discharged from the engine main body 10 to the exhaust passage 20, that is, the engine rotational speed NE of the internal combustion engine. Therefore, in the operating region in which the intake air amount Ga flowing into the engine main body 10, that is, the flow rate of the exhaust gas is sufficient, the differential pressure $\Delta P$ is correspondingly large, and the engine rotational speed NE is stable, the second estimated amount calculation unit 63 calculates the second estimated amount PMc based on the differential pressure $\Delta P$ detected by the differential pressure sensor 41. In the second estimated amount calculation unit 63, a map showing the relationship between the differential pressure $\Delta P$ calculated based on the output signal from the differential pressure sensor 41 and the second estimated amount PMc is stored. This map is previously obtained by experiment and simulation.

When the second estimated amount PMc is calculated by the second estimated amount calculation unit 63, the deviation storage unit 65 calculates and stores the value obtained by subtracting the first estimated amount PMf calculated by the first estimated amount calculation unit 62 from the second estimated amount PMc as a deviation $\Delta PM$ ($\Delta PM=PMc-PMf$).

The PM deposition amount calculation unit 64 calculates the PM deposition amount Pr, which is the amount of PM deposited in the PM filter 31. When the differential pressure sensor 41 is normal and an operating region is entered where the second estimated amount PMc is calculated by the second estimated amount calculation unit 63, the PM deposition amount calculation unit 64 calculates, as the PM deposition amount Pr, the larger value of the first estimated amount PMf and the second estimated amount PMc. That is, when the first estimated amount PMf is equal to or more than the second estimated amount PMc (PMf≥PMc), the PM deposition amount calculation unit 64 calculates the first estimated amount PMf as the PM deposition amount Pr (Pr=PMf). Further, when the first estimated amount PMf is less than the second estimated amount PMc (PMf<PMc), the PM deposition amount calculation unit 64 calculates the second estimated amount PMc as the PM deposition amount Pr (Pr=PMc). Thereafter, when the operation is no longer in the operating region in which the second estimated amount calculation unit 63 calculates the second estimated amount PMc, the PM deposition amount calculation unit 64 calculates the PM deposition amount Pr based on the deviation $\Delta PM$ stored in the deviation storage unit 65 and the first estimated amount PMf calculated by the first estimated amount calculation unit 62. That is, when the second estimated amount PMc is equal to or less than the first estimated amount PMf in the operating region in which the second estimated amount PMc is calculated and the deviation $\Delta PM$ stored in the deviation storage unit 65 is 0 or less, the PM deposition amount calculation unit 64 calculates the first estimated amount PMf calculated by the first estimated amount calculation unit 62 as the PM deposition amount Pr after the operation is no longer in the operating region for calculating the second estimated amount PMc. Further, if the second estimated amount PMc is larger than the first estimated amount PMf and the deviation $\Delta PM$ stored in the deviation storage unit 65 is larger than 0 in the operating region where the second estimated amount PMc is calculated, the PM deposition amount calculation unit 64 calculates a value obtained by adding the first estimated amount PMf calculated by the first estimated amount calculation unit 62 and the deviation $\Delta PM$ as the PM deposition amount Pr after the operation is no longer in the operating region for calculating the second estimated amount PMc.

Furthermore, if the differential pressure sensor 41 has an anomaly, the PM deposition amount calculation unit 64 calculates the first estimated amount PMf calculated by the first estimated amount calculation unit 62 as the PM deposition amount Pr without using the second estimated amount PMc. During the execution of the filter regeneration control, the PM deposition amount calculation unit 64 adds the PM discharge amount calculated by the first estimated amount calculation unit 62 to the PM deposition amount Pr, and subtracts the PM combustion amount calculated by the PM combustion amount estimation unit 68 from the PM deposition amount Pr. In this manner, the PM deposition amount Pr during execution of the filter regeneration control is calculated.

The start request determination unit 66 determines whether or not there is a request to start filter regeneration control. When the PM deposition amount Pr calculated by the PM deposition amount calculation unit 64 is equal to or more than the first predetermined amount, the start request determination unit 66 determines that there is a start request for the filter regeneration control. The first predetermined amount is set to be slightly smaller amount than the allowable upper limit value of the PM deposition amount in the PM filter 31. The first predetermined amount is previously obtained by experiment and simulation and stored in the control device 60.

When it is determined that there is a start request for the filter regeneration control, the execution unit 67 starts the filter regeneration control. In addition, when there is an end request for the filter regeneration control after starting the filter regeneration control, the execution unit 67 ends the filter regeneration control. In the filter regeneration control, the injection valve control unit 61 is controlled so that the target fuel injection amount is larger than the fuel amount that corresponds to the theoretical air fuel ratio. As a result, the exhaust gas containing unburned fuel is discharged to the exhaust passage 20. The unburned fuel is burned by an oxidation reaction in the oxidation catalyst 30, which raises the temperature of the exhaust gas. When the exhaust gas having a high temperature capable of burning the PM flows to the PM filter 31, the PM trapped in the PM filter 31 is burned and removed. The temperature of the exhaust gas at which the PM can be burned is referred to as "regeneration temperature."

The PM combustion amount estimation unit 68 calculates the PM combustion amount which is the amount of PM burned and removed by the filter regeneration control. Based on the temperature of the exhaust gas in the second exhaust pipe 23 calculated based on the output signal from the exhaust gas temperature sensor 40, the PM combustion amount estimation unit 68 calculates the PM combustion amount, which is the amount of PM burned and removed by the filter regeneration control. A map showing a relationship between the temperature of the exhaust gas in the second exhaust pipe 23 and the PM combustion amount is previously obtained by experiment and simulation and stored.

The end request determination unit 69 determines whether or not there is an end request for the filter regeneration control. After the start of the filter regeneration control, when the PM deposition amount Pr calculated by the PM deposition amount calculation unit 64 is equal to or less than a second predetermined amount, the end request determination unit 69 determines that there is an end request for the filter regeneration control. The second predetermined amount is set to an amount adequately smaller than an allowable upper limit value of the PM deposition amount in the PM filter 31 and smaller than the first predetermined amount. The second predetermined amount is previously obtained by experiment and simulation and stored in the control device 60.

The ignition switch operation determination unit 70 determines based on the output signal from the ignition switch 47, whether or not the ignition switch 47 is switched from an ON state to an OFF state, and whether or not the ignition switch 47 is switched from the OFF state to the ON state.

The reference point learning unit 71 learns a reference point in the output signal of the differential pressure sensor 41. A reference voltage of the differential pressure sensor 41 when the differential pressure ΔP is 0 is different for each sensor. Therefore, after the ignition switch 47 is switched from the ON state to the OFF state, based on an output voltage of the differential pressure sensor 41 in a state before the ignition switch 47 is switched from the OFF state to the ON state and the differential pressure ΔP is approximately 0, the reference point learning unit 71 learns the reference point and stores the learned value for rendering the reference point as a predetermined value. In this manner, the reference point learning unit 71 calculates the learned value based on the state of the differential pressure sensor 41 during the period from stopping of the internal combustion engine to a startup.

When it is determined, by the ignition switch operation determination unit 70, that the ignition switch 47 is switched from the OFF state to the ON state, the anomaly determination unit 72 performs, based on the learned value learned by the reference point learning unit 71, an anomaly determination of the differential pressure sensor 41. When the learned value is equal to or more than an upper limit determination value or the learned value is less than a lower limit determination value, the anomaly determination unit 72 determines that the differential pressure sensor 41 has an anomaly. As described above, the learned value is calculated based on the state of the differential pressure sensor 41 during the period from stopping of the internal combustion engine to the startup. Thus, the anomaly determination unit 72 performs the anomaly determination of the differential pressure sensor 41 based on the state of the differential pressure sensor 41 during the period from stopping of the internal combustion engine to the startup.

After the ignition switch 47 is switched by the ignition switch operation determination unit 70 from the OFF state to the ON state, when the internal combustion engine is started, the correction processing unit 73 executes a correction process to correct the first estimated amount PMf based on the second estimated amount PMc. After the ignition switch 47 is switched from the OFF state to the ON state and the anomaly determination of the differential pressure sensor 41 is performed by the anomaly determination unit 72, the correction processing unit 73 executes the correction process. When the differential pressure sensor 41 is normal, the correction processing unit 73 executes the correction process. In contrast, the correction processing unit 73 refrains from executing the correction process when the differential pressure sensor 41 has an anomaly. "When the internal combustion engine is started" corresponds to the period from when the ignition switch 47 is switched from the OFF state to the ON state to an end of the startup of the internal combustion engine. The startup of the internal combustion engine ends when the internal combustion engine is in an idle operating state after an end of complete explosion. Whether or not the internal combustion engine is in the idle operating state can be determined depending on whether or not a state where the rotational speed of the internal combustion engine is higher than a predetermined rotational speed continues for a predetermined time.

When the deviation ΔPM stored in the deviation storage unit 65 is smaller than 0 (ΔPM<0), that is, when the first estimated amount PMf is larger than the second estimated amount PMc, the correction processing unit 73 performs decreasing correction on the first estimated amount by the correction process. In this case, first, the correction processing unit 73 calculates the correction amount based on the deviation ΔPM.

Figure 3:
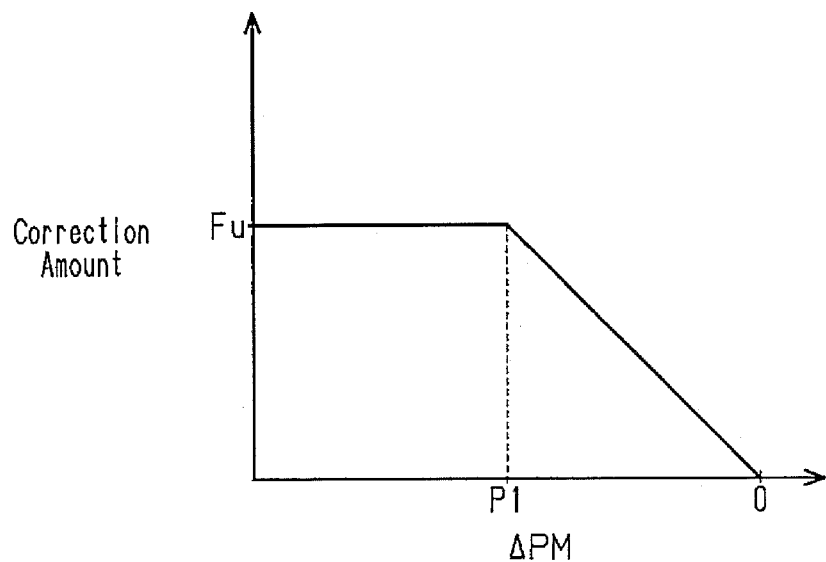
FIG. 3 is a map illustrating a relationship between a deviation and a correction amount.

As shown in FIG. 3, in the correction processing unit 73, a map showing the relationship between the deviation ΔPM and the correction amount is previously obtained by experiment and simulation and stored. As shown in FIG. 3, in a region where the deviation ΔPM ranges from 0 to a predetermined amount P1 smaller than 0, the smaller the deviation ΔPM is, the larger becomes the correction amount when the decreasing correction is performed on the first estimated amount PMf. After calculating the correction amount, the correction processing unit 73 subtracts the correction amount from the first estimated amount PMf calculated by the first estimated amount calculation unit 62 to calculate a corrected first estimated amount PMf. In the region where the deviation ΔPM ranges from 0 to the predetermined amount P1, the correction amount is set to correct the first estimated amount PMf to a value equal to the second estimated amount PMc. As a result, the value of the first estimated amount PMf is equalized with the second estimated amount PMc by the correction process.

Further, as shown in FIG. 3, an upper limit is set for the correction amount of the first estimated amount PMf. That is, when the deviation ΔPM is equal to or less than the predetermined amount P1, even if the deviation ΔPM decreases further, the correction amount remains unchanged and is equalized with an upper limit value Fu. In this case, when the difference between the first estimated amount PMf and the second estimated amount PMc is large and the deviation ΔPM is equal to or less than the predetermined amount P1, the value of the first estimated amount PMf will not be reduced to be equal to the second estimated amount PMc by a single correction process.

Further, when the deviation ΔPM stored in the deviation storage unit 65 is larger than 0 (ΔPM>0), that is, when the first estimated amount PMf is smaller than the second estimated amount PMc, the correction processing unit 73 performs increasing correction on the first estimated amount PMf by the correction process. In this case, the correction processing unit 73 adds the value equal to the deviation ΔPM to the first estimated amount PMf calculated by the first estimated amount calculation unit 62 to calculate a corrected first estimated amount PMf. As a result, the value of the first estimated amount PMf is corrected to be equal to the value of the second estimated amount PMc by a single correction process. As described above, in the correction processing unit 73, the upper limit is set for the correction amount when the decreasing correction is performed on the first estimated amount PMf. That is, when the deviation ΔPM is equal to or less than the predetermined amount P1, the correction amount obtained by the single correction process is smaller than a correction amount required for eliminating a discrepancy by the deviation ΔPM. For this reason, when the decreasing correction is performed on the first estimated amount PMf, a level of correction of the first estimated amount PMf can be made smaller than that when the increasing correction is performed.

When the first estimated amount PMf is corrected by the correction processing unit 73, the first estimated amount calculation unit 62 adds up the PM discharge amount and the corrected first estimated amount PMf to calculate the first estimated amount PMf.

As shown in FIG. 2, when the anomaly determination unit 72 determines that the differential pressure sensor 41 has an anomaly, the notification unit 74 lights up the notification lamp 49 to issue notification of the anomaly.

With reference to the flowchart of FIG. 4, the flow of a series of processes related to the correction process executed by the control device 60 will be described. The series of processes is executed at predetermined time intervals.

Figure 4:
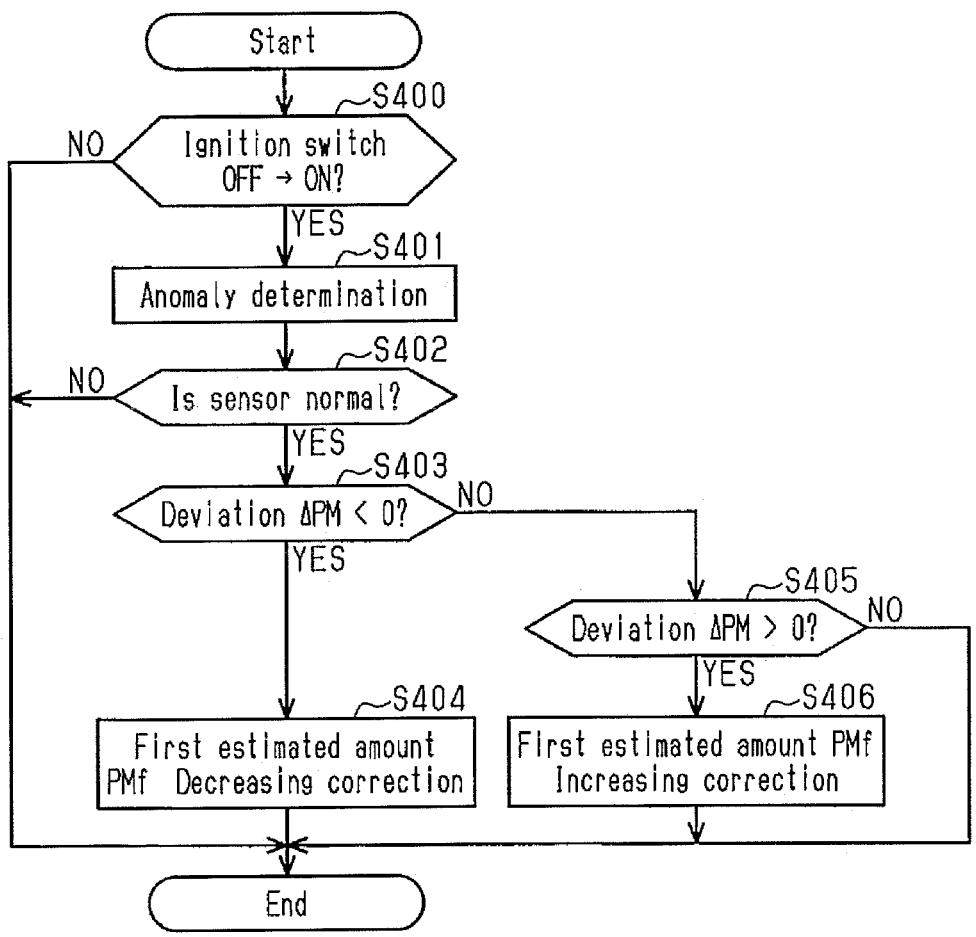
FIG. 4 is a flowchart illustrating the flow of a series of processes related to a correction process.

As shown in FIG. 4, first, the ignition switch operation determination unit 70 determines whether or not the ignition switch 47 is switched from the OFF state to the ON state (step S400). When the startup operation of the internal combustion engine is executed and the ignition switch 47 is switched from the OFF state to the ON state, the anomaly determination unit 72 performs the anomaly determination of the differential pressure sensor 41 (step S401). When a state of the ignition switch 47 determined in a previous process is in the OFF state and a state of the ignition switch 47 determined in a current process is in the ON state, the ignition switch operation determination unit 70 determines that the ignition switch 47 is switched from the OFF state to the ON state.

The anomaly determination unit 72 performs the anomaly determination of the differential pressure sensor 41 based on the learned value learned by the reference point learning unit 71. The learned value is calculated in a period during which the ignition switch 47 is in the OFF state immediately before it is determined that the ignition switch 47 is switched from the OFF state to the ON state in the process of step S400. When the learned value is equal to or more than the upper limit determination value or less than the lower limit determination value, the anomaly determination unit 72 determines that the differential pressure sensor 41 has an anomaly. In this case, the notification unit 74 lights up the notification lamp 49 to issue notification of the anomaly. When the learned value is less than the upper limit determination value and is equal to or more than the lower limit determination value, the anomaly determination unit 72 determines that the differential pressure sensor 41 is normal. Thus, the anomaly determination unit 72 performs the anomaly determination of the differential pressure sensor 41 based on the state of the differential pressure sensor 41 during the period from stopping of the internal combustion engine to the startup of the internal combustion engine. Next, the correction processing unit 73 determines whether or not the differential pressure sensor 41 is determined to be normal by the anomaly determination unit 72 (step S402).

When the differential pressure sensor 41 is normal (step S402: YES), the correction processing unit 73 shifts to the process of step S403 to execute the correction process. First, the correction processing unit 73 determines whether or not the deviation ΔPM stored in the deviation storage unit 65 is smaller than 0 (step S403). When the deviation ΔPM is smaller than 0 (step S403: YES), that is, when the first estimated amount PMf is larger than the second estimated amount PMc, the correction processing unit 73 performs the decreasing correction where the correction amount calculated based on the deviation ΔPM is subtracted from the first estimated amount PMf (step S404). When the correction processing unit 73 performs the decreasing correction on the first estimated amount PMf, the control device 60 ends the series of processes related to the correction process.

Further, when the deviation ΔPM is not smaller than 0 (step S403: NO), the correction processing unit 73 determines whether or not the deviation ΔPM is larger than 0 (step S405). When the deviation ΔPM is larger than 0 (step S405: YES), that is, when the first estimated amount PMf is smaller than the second estimated amount PMc, the correction processing unit 73 performs the increasing correction where the deviation ΔPM is added to the first estimated amount PMf (step S406). When the correction processing unit 73 performs the increasing correction on the first estimated amount PMf, the control device 60 ends the series of processes related to the correction process.

When the deviation ΔPM is not larger than 0 (step S405: NO), that is, when the value of the first estimated amount PMf is equal to the value of the second estimated amount PMc, the correction processing unit 73 does not correct the first estimated amount PMf. In this case, the control device 60 ends the series of processes related to the correction process without the first estimated amount PMf being corrected by the correction processing unit 73. When the increasing correction or the decreasing correction is performed on the first estimated amount PMf in the correction process, the deviation storage unit 65 resets the deviation ΔPM to 0. Thereafter, when the operation is in the operating region in which the second estimated amount calculation unit 63 calculates the second estimated amount PMc, the deviation storage unit 65 calculates and stores the deviation ΔPM based on the calculated second estimated amount PMc and first estimated amount PMf.

If the differential pressure sensor 41 has an anomaly (step S402: NO), the correction processing unit 73 does not perform the correction process from the following step S403 to step S406. Thereafter, the control device 60 ends the series of processes related to the correction process.

When the ignition switch 47 is not switched from the OFF state to the ON state (step S400: NO), the control device 60 ends the series of processes related to the correction process without executing the subsequent processes. When the first estimated amount PMf is corrected by the processes of step S404 and step S406, the first estimated amount calculation unit 62 then adds up the PM discharge amount calculated per unit time based on the operating state of the internal combustion engine, with respect to the corrected first estimated amount PMf, so as to calculate the first estimated amount PMf.

Next, with reference to the flowchart of FIG. 5, a flow of a series of processes related to the filter regeneration control executed by the control device 60 will be described. The series of processes is repeatedly executed in each predetermined control cycle when the internal combustion engine is in an operating state.

Figure 5:
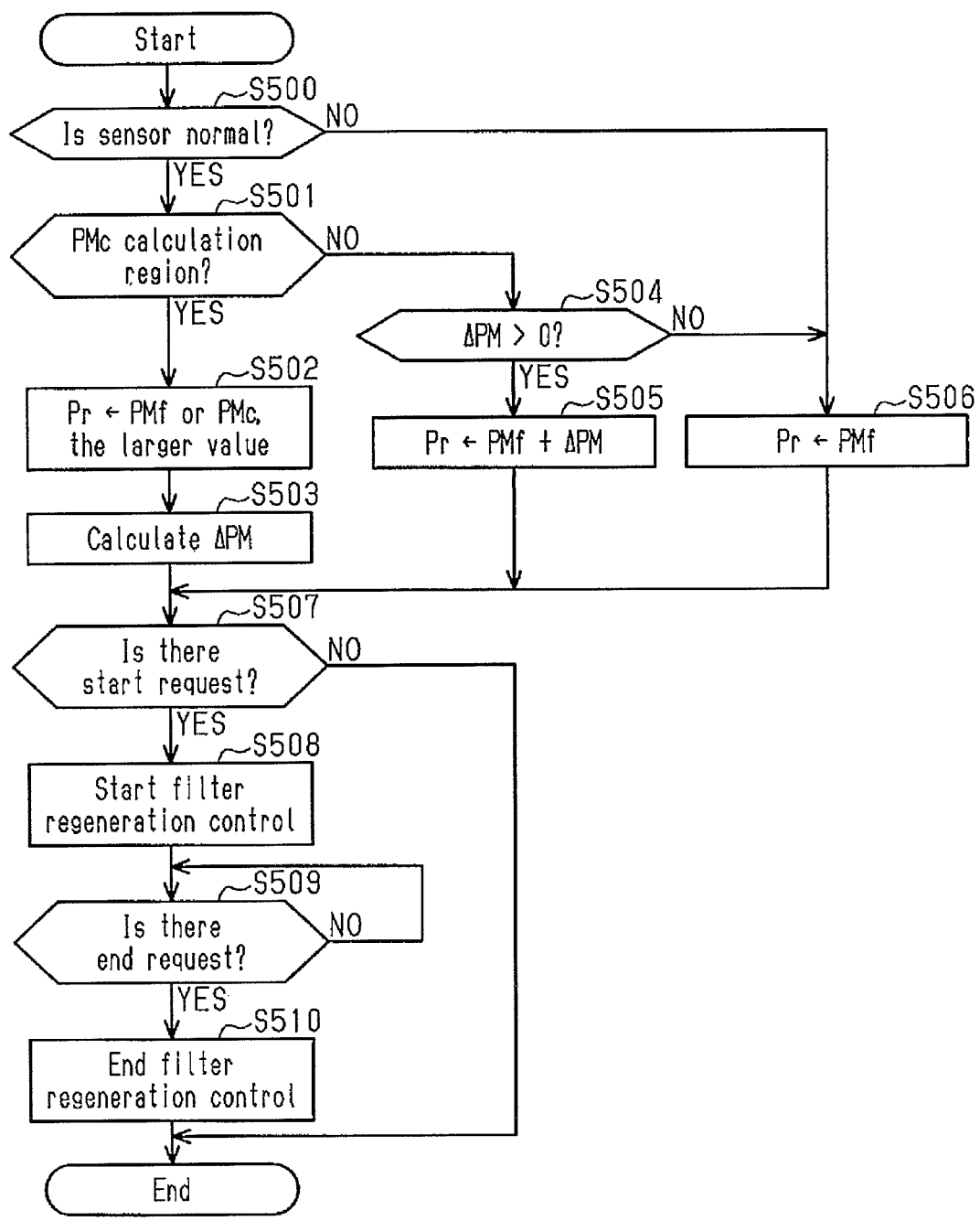
FIG. 5 is a flowchart illustrating the flow of a series of processes related to a filter regeneration control.

As shown in FIG. 5, first, the control device 60 determines whether or not the differential pressure sensor 41 is normal (step S500). The series of processes related to the above-described regeneration process is executed when the internal combustion engine is started, and is executed at an earlier time than the series of processes. Therefore, in the process of step S500, the control device 60 determines whether or not the differential pressure sensor 41 is normal based on a result of the anomaly determination (process of step S401 in FIG. 4) executed by the anomaly determination unit 72.

When the differential pressure sensor 41 is normal (step S500: YES), the control device 60 determines whether or not the operating region of the internal combustion engine is an operating region where the second estimated amount PMc is calculated (step S501). When the differential pressure OP is adequately large and the engine rotational speed NE is stable, the control device 60 determines that the operating region of the internal combustion engine is the operating region where the second estimated amount PMc is calculated (step S501: YES), and then, moves to the process of step S502. In the process of step S502, the PM deposition amount calculation unit 64 calculates, as the PM deposition amount Pr, the larger value of the first estimated amount PMf and the second estimated amount PMc. Thereafter, the deviation storage unit 65 calculates and stores, as the deviation ΔPM, a value obtained by subtracting the first estimated amount PMf from the second estimated amount PMc (step S503).

When the operating region of the internal combustion engine is not the operating region where the second estimated amount PMc is calculated (step S501: NO), the control device 60 determines whether or not the deviation ΔPM stored in the deviation storage unit 65 is larger than 0 (step S504). In a case where the deviation ΔPM is larger than 0, it is possible to determine that a situation in which the operating region of the internal combustion engine is the operating region where the second estimated amount PMc is calculated after the deviation ΔPM is reset to 0 after execution of the correction process, occurs in the past, and the second estimated amount PMc is larger than the first estimated amount PMf in that operating region. Therefore, if an affirmative determination is made in the process of step S504 (step S504: YES), the PM deposition amount calculation unit 64 calculates, as the PM deposition amount Pr, a value obtained by adding the first estimated amount PMf and the deviation ΔPM stored in the deviation storage unit 65 (step S505).

Further, when the differential pressure sensor 41 has an anomaly (step S500: NO) and when a negative determination is made in the process of step S504 (step S504: NO), the PM deposition amount calculation unit 64 calculates the first estimated amount PMf, as the PM deposition amount Pr (step S506).

After calculating the PM deposition amount Pr, the control device 60 shifts to the process of step S507. Then, the start request determination unit 66 determines whether there is a start request for the filter regeneration control. When the PM deposition amount Pr is equal to or more than the first predetermined amount and there is a start request for the filter regeneration control (step S507: YES), the execution unit 67 starts the filter regeneration control (step S508). Thereafter, the end request determination unit 69 determines whether there is an end request for the filter regeneration control (step S509). Immediately after the start of the filter regeneration control, the PM combustion amount after the start of filter regeneration control is small. Thus, the PM deposition amount Pr calculated by the PM deposition amount calculation unit 64 exceeds the second predetermined amount, and the end request determination unit 69 determines that there is no end request (step S509: NO). If there is no end request, the control device 60 repeatedly executes the process of step S509. Thereafter, when an adequate period of time has elapsed, the PM combustion amount after the start of filter regeneration control becomes large. Thus, the PM deposition amount Pr calculated by the PM deposition amount calculation unit 64 is equal to or less than the second predetermined amount, and the end request determination unit 69 determines that there is an end request (step S509: YES). In this case, the control device 60 shifts to the process of step S510. In the process of step S510, the execution unit 67 ends the filter regeneration control. As a result, the control device 60 ends the series of processes related to the filter regeneration control.

Further, when the PM deposition amount Pr is less than the first predetermined amount, the start request determination unit 66 determines that there is no start request for the filter regeneration control (step S507: NO). In this case, the control device 60 ends the series of processes without executing processes from the following step S508 to step S510, that is, the filter regeneration control.

Operation and advantages of the present embodiment will now be described with reference to FIGS. 6A to 7E. First, with reference to FIGS. 6A to 6E, a case where the differential pressure sensor is normal will be described as an example.

(1) As shown in FIG. 6A, at a point in time t610, the ignition switch 47 is switched from the ON state to the OFF state. Then, the internal combustion engine enters a stopped state. In this state, the reference point learning unit 71 learns the reference point in the output signal of the differential pressure sensor 41, and stores the learned value for setting the reference point to a predetermined value.

Thereafter, at a point in time t611, the ignition switch 47 is switched from the OFF state to the ON state. Then, the internal combustion engine shifts from a stopped state into a starting state. The period from the point in time t611 to a point in time t613, at which the internal combustion engine enters the idle operating state, is referred to as the starting state of the internal combustion engine. That is, "when the internal combustion engine is started" refers to a period during which the internal combustion engine is in the starting state. Further, the point in time t613, at which the internal combustion engine enters the idle operating state and the subsequent time is referred to as "normal operating states." The control device 60 determines whether or not the internal combustion engine has entered the idle operating state based on whether or not a state where the rotational speed of the internal combustion engine is higher than a predetermined rotational speed continues for a predetermined time period.

At a point in time t611, a series of processes related to the regeneration process is executed. First, anomaly determination of the differential pressure sensor 41 is performed by the anomaly determination unit 72. In examples shown in FIGS. 6A to 6E, the differential pressure sensor 41 is normal. As shown in FIG. 6C, in the anomaly determination at the point in time t611, the differential pressure sensor 41 is determined to be normal. Therefore, as shown in FIG. 6D, the notification lamp 49 is not lit.

Thereafter, at a point in time t612 after the point in time t611, the correction process is executed by the correction processing unit 73. The deviation $\Delta$PM stored, immediately before the point in time t610, in the deviation storage unit 65 when the internal combustion engine is in the operating state is 0. In this case, in the correction process at the point in time t612, since the value of the first estimated amount PMf is equal to the value of the second estimated amount PMc, the first estimated amount PMf is not corrected and remains unchanged.

As indicated by the solid line in FIG. 6B, from the point in time t611 onwards, the first estimated amount calculation unit 62 calculates the first estimated amount PMf based on the operating state of the internal combustion engine. The period from the point in time t611 to the point in time t614 corresponds to an operating region where a change in engine rotational speed NE of the internal combustion engine is large and the second estimated amount PMc is not calculated. Further, as described above, the deviation $\Delta$PM stored by the deviation storage unit 65 is 0. Therefore, during the period from the point in time t611 to the point in time t614, the first estimated amount PMf is calculated as the PM deposition amount Pr.

At the point in time t614, the differential pressure $\Delta$P increases to some extent and the engine rotational speed NE stabilizes. Thus, the operating state of the internal combustion engine reaches a state where the differential pressure $\Delta$P detected by the differential pressure sensor 41 and the amount of PM deposited in the PM filter 31 have a correlation. Therefore, the second estimated amount calculation unit 63 calculates the second estimated amount PMc based on the differential pressure $\Delta$P detected by the differential pressure sensor 41. The second estimated amount PMc is larger than the first estimated amount PMf indicated by the long dashed short dashed line in FIG. 6B. Thus, as indicated by the solid line in FIG. 6B, the PM deposition amount calculation unit 64 calculates the second estimated amount PMc as the PM deposition amount Pr.

Thereafter, at a point in time t615, the engine rotational speed NE of the internal combustion engine is changed, for example, and enters another operating region where the second estimated amount PMc is not calculated. Then, the second estimated amount calculation unit 63 stops calculating the second estimated amount PMc based on the differential pressure $\Delta$P. In an example shown in FIGS. 6A to 6E, in the period from the point in time t614 to a point in time t615, the second estimated amount PMc is calculated. Then, when the second estimated amount PMc is calculated, the deviation storage unit 65 calculates and stores the deviation $\Delta$PM obtained by subtracting the first estimated amount PMf from the second estimated amount PMc. The latest calculated value is stored as the deviation $\Delta$PM. That is, the deviation $\Delta$PM calculated at the point in time t615 is stored as a deviation $\Delta$PM(1). In this case, the deviation $\Delta$PM(1) is larger than 0. For this reason, as indicated by the solid line in FIG. 6B, after the point in time t615, the PM deposition amount calculation unit 64 calculates, as the PM deposition amount Pr, a value obtained by adding the deviation $\Delta$PM(1) to the first estimated amount PMf.

As shown in FIG. 6A, the ignition switch 47 is switched from the ON state to the OFF state at a point in time t616. Then, the internal combustion engine enters a stopped state. In this state, the reference point learning unit 71 again learns the reference point in the output signal of the differential pressure sensor 41 and stores the learned value for setting the reference point to a predetermined value. When the internal combustion engine is in a stopped state, the PM deposition amount Pr is not calculated, and thus, the value becomes 0. While the internal combustion engine is in the stopped state, the control device 60 maintains the values of the first estimated amount PMf and the deviation $\Delta$PM(1).

Thereafter, at a point in time t617, the ignition switch 47 is switched from the OFF state to the ON state. Then, the internal combustion engine shifts from a stopped state into a starting state. As a result, a series of processes related to the regeneration process is started, and anomaly determination of the differential pressure sensor 41 is executed. At a point in time t618 after the point in time t617, the correction process is executed. Further, when the internal combustion engine is started, the PM deposition amount calculation unit 64 starts calculating the PM deposition amount Pr. At the point in time t617, the value obtained by adding the first estimated amount PMf and the deviation $\Delta$PM(1) stored in the control device 60 is calculated as the PM deposition amount Pr.

In the correction process, the first estimated amount PMf is corrected based on the deviation $\Delta$PM(1) stored by the deviation storage unit 65 when the internal combustion engine immediately before the point in time t616 is in the operating state (the point in time t611 to the point in time t616). Since the deviation $\Delta$PM(1) is larger than 0, the first estimated amount PMf is subject to the increasing correction so that the value of the corrected first estimated amount PMf is equalized with the second estimated amount PMc. Further, when it is assumed that the second estimated amount calculation unit 63 calculates the second estimated amount PMc at a point in time t618, the difference between the value of the second estimated amount PMc and the value of the uncorrected first estimated amount PMf can be regarded as equal to the deviation $\Delta$PM(1). Therefore, by adding the deviation $\Delta$PM to the first estimated amount PMf, the corrected first estimated amount PMf will be equalized with the second estimated amount PMc. As described above, by increasing the uncorrected first estimated amount PMf by the deviation $\Delta$PM, a discrepancy between the first estimated amount PMf and the second estimated amount PMc is eliminated by a single correction process, and the corrected first estimated amount PMf is equalized with the second estimated amount PMc. That is, as indicated by the long dashed short dashed line in FIG. 6B, the first estimated amount PMf increases by the deviation $\Delta$PM at the point in time t618. As a result, the deviation storage unit 65 resets the stored deviation ΔPM to 0. At the point in time t618, the second estimated amount PMc is not calculated, and the deviation ΔPM is 0. Thus, the corrected first estimated amount PMf is calculated as the PM deposition amount Pr.

After the point in time t618, the first estimated amount calculation unit 62 adds up PM discharge amount calculated based on the operating state of the internal combustion engine and the corrected first estimated amount PMf so as to calculate the first estimated amount PMf. The period from the point in time t618 to a point in time t619 corresponds to an operating region where the second estimated amount PMc is not calculated. For this reason, the PM deposition amount Pr increases with an increase of the first estimated amount PMf.

As indicated by the solid line in FIG. 6B, at the point in time t619, the PM deposition amount Pr is equal to or more than the first predetermined amount. At this time, it is determined that there is a start request for the filter regeneration control, and as shown in FIG. 6E, a series of processes related to the filter regeneration control is started. When the filter regeneration control is started, the PM trapped in the PM filter 31 is burned and removed. As a result, as indicated by the solid line in FIG. 6B, the PM deposition amount Pr decreases.

At a point in time t620, at which the PM deposition amount Pr is equal to or less than the second predetermined amount, the filter regeneration control ends, as shown in FIG. 6E. Even after that, the operating state of the internal combustion engine continues. Therefore, as shown in FIG. 6B, the PM deposition amount Pr also increases with an increase of the first estimated amount PMf.

At a point in time t621, at which an adequate period of time has passed since the point in time t620, the operating state of the internal combustion engine enters a state where the differential pressure ΔP and the amount of PM deposited in the PM filter 31 have a correlation. Therefore, the second estimated amount calculation unit 63 calculates the second estimated amount PMc. The second estimated amount PMc indicated by the long dashed double-short dashed line in FIG. 6B is smaller than the first estimated amount PMf. Thus, as indicated by the solid line in FIG. 6B, the PM deposition amount calculation unit 64 calculates the first estimated amount PMf as the PM deposition amount Pr.

Thereafter, at a point in time t622, the ignition switch 47 is switched from the ON state to the OFF state. Then, the internal combustion engine enters a stopped state. During the period from the point in time t621 to the point in time t622, at which the internal combustion engine is stopped, the second estimated amount PMc is calculated. The deviation storage unit 65 stores, as a deviation ΔPM(2), a deviation between the first estimated amount PMf and the second estimated amount PMc at the point in time t622. In this case, the deviation ΔPM(2) is smaller than 0. Further, when the internal combustion engine enters the stopped state, the reference point learning unit 71 again learns the reference point in the output signal of the differential pressure sensor 41 and stores a learned value for setting the reference point to a predetermined value. After the point in time t622, the internal combustion engine is in the stopped state, and thus, the PM deposition amount Pr is 0.

Thereafter, at a point in time t623, the ignition switch 47 is switched from the OFF state to the ON state. Then, the internal combustion engine enters a starting state from the stopped state. As a result, a series of processes related to the regeneration process is started, and anomaly determination of the differential pressure sensor 41 is executed. Further, at a point in time t624 after the point in time t623, the correction process is executed. Further, when the internal combustion engine is started, the PM deposition amount calculation unit 64 starts calculating the PM deposition amount Pr. As described above, the deviation ΔPM(2) stored in the deviation storage unit 65 is a value smaller than 0. Therefore, at the point in time t623, the first estimated amount PMf stored in the control device 60 is calculated as the PM deposition amount Pr.

In the correction process at a point in time t624, the first estimated amount PMf is corrected based on the deviation ΔPM(2) stored by the deviation storage unit 65 when the internal combustion engine immediately before the point in time t622 is in the operating state (the point in time t617 to the point in time t622). Since the deviation ΔPM(2) is smaller than 0, the decreasing correction is performed on the first estimated amount PMf by subtracting the correction amount calculated based on the map shown in FIG. 3 from the first estimated amount PMf. In this example, since the deviation ΔPM(2) is equal to or less than the predetermined amount P1, a value equal to the upper limit value Fu is calculated as the correction amount. Further, when it is assumed that the second estimated amount calculation unit 63 calculates the second estimated amount PMc at the point in time t624, the difference between the value of the second estimated amount PMc and the value of the uncorrected first estimated amount PMf can be regarded as equal to the deviation ΔPM(2). Further, the upper limit value Fu is a value smaller than the deviation ΔPM(2). Therefore, the corrected first estimated amount PMf obtained by subtracting the upper limit value Fu as correction amount from the uncorrected first estimated amount PMf is not equalized with the second estimated amount PMc calculated at the point in time t624 (the second estimated amount PMc at the point in time t622). That is, the corrected first estimated amount PMf is larger in value than the second estimated amount PMc. Thereafter, the first estimated amount PMf is calculated as the PM deposition amount Pr until the operating region where the second estimated amount PMc is calculated is reached. When the deviation ΔPM stored after the point in time t624 is smaller than 0, the decreasing correction is performed on the first estimated amount PMf by the correction process executed when the internal combustion engine is started next. As described above, by executing the correction process a number of times, the value of the corrected first estimated amount PMf is equalized with the second estimated amount PMc. As a result, the discrepancy between the first estimated amount PMf and the second estimated amount PMc is eliminated.

In the present embodiment, when starting the internal combustion engine, the first estimated amount PMf calculated based on the operating state of the internal combustion engine is corrected based on the second estimated amount PMc calculated based on the differential pressure ΔP of the PM filter 31. The differential pressure ΔP of the PM filter 31 is detected by the differential pressure sensor 41. The anomaly determination of the differential pressure sensor 41 is performed based on the state in the period from stopping of the internal combustion engine to the startup. It is thus appropriate to perform the anomaly determination of the differential pressure sensor 41 at the time of starting the internal combustion engine. Therefore, at the time of starting the internal combustion engine, it is possible to calculate the second estimated amount PMc supported by the differential pressure sensor 41 being normal. Thus, it is possible to ensure accuracy in calculating the second estimated amount PMc. The first estimated amount PMf is calculated based on the operating state of the internal combustion engine. Therefore, the operation range of the internal combustion engine where the first estimated amount PMf can be calculated is wide. In contrast, the operating region of the internal combustion engine when the differential pressure ΔP detected by the differential pressure sensor 41 and the amount of PM deposited in the PM filter 31 have a correlation is limited. Therefore, the operation range of the internal combustion engine that can calculate the second estimated amount PMc is narrow. The influence of the amount of PM actually deposited in the PM filter 31 is reflected in the differential pressure ΔP of the PM filter 31. The second estimated amount PMc is thus more likely to reflect the actual amount of PM deposited in the PM filter 31 than the first estimated amount PMf. Therefore, in the present embodiment, the first estimated amount PMf is corrected based on the second estimated amount PMc in consideration of time that is appropriate when the anomaly determination of the differential pressure sensor 41 is performed. As a result, when calculating the PM deposition amount Pr by correcting the first estimated amount PMf based on the second estimated amount PMc, it is possible to suppress deterioration in calculation accuracy of the PM deposition amount Pr.

(2) When performing the increasing correction on the first estimated amount PMf at the point in time t618, the first estimated amount PMf is increased in amount so that the corrected first estimated amount PMf is equalized with the second estimated amount PMc by a single correction process. When performing the decreasing correction on the first estimated amount PMf at the point in time t624, an upper limit is provided for the correction amount. That is, when the deviation ΔPM is equal to or less than the predetermined amount P1, the correction amount obtained by the single correction process is smaller than a correction amount required for eliminating the discrepancy by the deviation ΔPM. For this reason, when the decreasing correction is performed on the first estimated amount PMf, the level of correction of the first estimated amount PMf can be made smaller than that when the increasing correction is performed. When the first estimated amount PMf is larger than the second estimated amount PMc, the first estimated amount PMf is used as the PM deposition amount Pr as a parameter for determining whether to execute the filter regeneration control. Therefore, by decreasing the level of correction when the decreasing correction is performed on the first estimated amount PMf, even if there occurs a situation where the accuracy of the second estimated amount PMc is deteriorated due to an influence such as a disturbance of the differential pressure sensor 41, it is possible to suppress a sudden change of the PM deposition amount Pr. As a result, when the first estimated amount PMf is corrected based on the second estimated amount PMc, it is possible to suppress a situation where the corrected first estimated amount PMf is smaller than an amount of PM actually deposited in the PM filter, and appropriately set the PM deposition amount Pr.

(3) When the increasing correction is performed on the first estimated amount PMf, the first estimated amount PMf is increased so that the corrected first estimated amount PMf is equalized with the second estimated amount PMc by a single correction process. Therefore, rather than a method for gradually performing the increasing correction by executing the correction process a number of times until the value of the first estimated amount PMf is equalized with the second estimated amount PMc, it is easier to avoid a situation at an early stage where the calculated PM deposition amount Pr is smaller than the amount of PM actually deposited in the PM filter.

(4) When the decreasing correction is performed on the first estimated amount PMf, an upper limit is set for the correction amount of the first estimated amount PMf by a single correction process. This makes it difficult for the value of the first estimated amount PMf to be reduced to be equal to the second estimated amount PMc by the single correction process. Thus, by executing the correction process a number of times, it is possible to gradually reduce the value of the first estimated amount PMf to be equal to the second estimated amount PMc. Therefore, it is possible to suppress a situation where the value of the corrected first estimated amount PMf is lower than the actual value of the PM deposition amount Pr due to a temporary disturbance of the detection signal of the differential pressure sensor 41. Thus, it is possible to appropriately set the PM deposition amount Pr.

(5) Next, with reference to FIGS. 7A to 7E, a case where an anomaly occurs in the differential pressure sensor 41 will be described as an example.

As shown in FIG. 7A, at a point in time t710, the ignition switch 47 is switched from the ON state to the OFF state. Then, the internal combustion engine enters a stopped state. In this state, the reference point learning unit 71 learns the reference point in the output signal of the differential pressure sensor 41, and stores the learned value for setting the reference point to a predetermined, value.

Thereafter, at a point in time t711, the ignition switch 47 is switched from the OFF state to the ON state. Then, the internal combustion engine shifts from a stopped state into a starting state. The period from the point in time t711 to a point in time t713, at which the internal combustion engine is in the idle operating state, is referred to as "starting state of the internal combustion engine." Further, the point in time t713, at which the internal combustion engine enters the idle operating state, and the subsequent time are referred to as a normal operating state.

At the point in time t711, a series of processes related to the reproduction process is executed. First, anomaly determination of the differential pressure sensor 41 is performed by the anomaly determination unit 72. As shown in FIG. 7C, in the anomaly determination at the point in time t711, the differential pressure sensor 41 is determined to be normal. Therefore, as shown in FIG. 7D, the notification lamp 49 is not lit.

Thereafter, at a point in time t712 after the point in time t711, the correction process is executed by the correction processing unit 73. The deviation ΔPM stored by the deviation storage unit 65 is 0. In this case, since the value of the first estimated amount PMf is equal to the value of the second estimated amount PMc, the first estimated amount PMf is not corrected and remains unchanged.

As indicated by the solid line in FIG. 7B, from the point in time t711 onwards, the first estimated amount calculation unit 62 calculates the first estimated amount PMf based on the operating state of the internal combustion engine. The period from the point in time t711 to the point in time t714 corresponds to an operating region where a change in engine rotational speed NE of the internal combustion engine is large and the second estimated amount PMc is not calculated. Further, as described above, the deviation ΔPM stored by the deviation storage unit 65 is 0. Therefore, after the PM deposition amount calculation unit 64 starts calculating the PM deposition amount Pr at the point in time t711, the first estimated amount PMf is calculated as the PM deposition amount Pr.

At a point in time t714, the differential pressure ΔP increases to some extent, and the engine rotational speed NE stabilizes. Thus, the operating state of the internal combustion engine reaches a state where the differential pressure ΔP detected by the differential pressure sensor 41 and the amount of PM deposited in the PM filter 31 have a correlation. Therefore, the second estimated amount calculation unit 63 calculates the second estimated amount PMc based on the differential pressure ΔP detected by the differential pressure sensor 41. Thereafter, at a point in time t716, the engine rotational speed NE of the internal combustion engine is changed, for example, and enters another operating region where the second estimated amount PMc is not calculated. Then, the second estimated amount calculation unit 63 stops calculating the second estimated amount PMc based on the differential pressure ΔP.

In this manner, the second estimated amount calculation unit 63 calculates the second estimated amount PMc based on the differential pressure ΔP detected by the differential pressure sensor 41 during the period from the point in time t714 to the point in time t716. At the point in time t714, the second estimated amount PMc is smaller than the first estimated amount PMf, but at the point in time t716, the second estimated amount PMc is larger than the first estimated amount PMf. Therefore, at the point in time t715 between the point in time t714 and the point in time t716, the second estimated amount PMc is equal to the first estimated amount PMf. In the period from the point in time t714 to the point in time t715, the first estimated amount PMf is larger than the second estimated amount PMc indicated by the long dashed double-short dashed line in FIG. 7B. As indicated by the solid line in FIG. 7B, the PM deposition amount calculation unit 64 calculates the first estimated amount PMf as the PM deposition amount Pr. Further, in the period from the point in time t715 to the point in time t716, the second estimated amount PMc is larger than the first estimated amount PMf indicated by the long dashed short dashed line in FIG. 7B. As indicated by the solid line in FIG. 7B, the PM deposition amount calculation unit 64 calculates the second estimated amount PMc as the PM deposition amount Pr.

When the second estimated amount PMc is calculated, the deviation storage unit 65 calculates and stores the deviation ΔPM obtained by subtracting the first estimated amount PMf from the second estimated amount PMc. The latest calculated value is stored as the deviation ΔPM. That is, the deviation storage unit 65 stores the deviation ΔPM calculated at the point in time t716. In this case, the deviation ΔPM is larger than 0.

After the point in time t716, an operating region emerges where the second estimated amount PMc is not calculated. As described above, the deviation ΔPM stored by the deviation storage unit 65 is larger than 0. For this reason, as indicated by the solid line in FIG. 7B, after the point in time t716, the PM deposition amount calculation unit 64 calculates, as the PM deposition amount Pr, a value obtained by adding the deviation ΔPM to the first estimated amount PMf. Then, as shown in FIG. 7A, at a point in time t717, the ignition switch 47 is switched from the ON state to the OFF state. Then, the internal combustion engine enters a stopped state. In this state, the reference point learning unit 71 again learns the reference point in the output signal of the differential pressure sensor 41 and stores the learned value for setting the reference point to a predetermined value. When the internal combustion engine is in a stopped state, the PM deposition amount Pr is not calculated, and thus, the value becomes 0. Further, while the internal combustion engine is in the stopped state, the control device 60 maintains the values of the first estimated amount PMf and the deviation ΔPM.

Thereafter, at a point in time t718, the ignition switch 47 is switched from the OFF state to the ON state. Then, the internal combustion engine shifts from a stopped state into a starting state. As a result, a series of processes related to the regeneration process is started, and anomaly determination of the differential pressure sensor 41 is executed. As shown in FIG. 7C, in this example, due to the anomaly determination at a point in time t718, the learned value is equal to or more than the upper limit value, and thus, the anomaly determination unit 72 determines that the differential pressure sensor 41 has an anomaly. When the differential pressure sensor 41 has an anomaly, as shown in FIG. 7D, the notification lamp 49 is lit to issue notification of the anomaly.

Further, since the differential pressure sensor 41 has an anomaly, the PM deposition amount calculation unit 64 calculates, irrespective of the deviation ΔPM, the first estimated amount PMf as the PM deposition amount Pr. Therefore, the PM deposition amount Pr (Pr=the first estimated amount PMf) at the point in time t718 is smaller than the PM deposition amount Pr (Pr=the first estimated amount PMf+ the deviation ΔPM) at the point in time t717.

Further, since the differential pressure sensor 41 has an anomaly, the correction process is not performed. Thus, at a point in time t719, at which the correction process is performed if the differential pressure sensor 41 is normal, the first estimated amount PMf is not corrected and remains unchanged. From a point in time t719 onwards, the PM deposition amount Pr increases with an increase of the first estimated amount PMf.

Then, as indicated by the solid line in FIG. 7B, at a point in time t720, the PM deposition amount Pr is equal to or more than the first predetermined amount. At this time, determination is made that there is a start request for the filter regeneration control, and a series of processes related to the filter regeneration control is started as shown in FIG. 7E. When the filter regeneration control is started, the PM trapped in the PM filter 31 is burned and removed. As a result, as shown by the solid line in FIG. 7B, the PM deposition amount Pr decreases.

At a point in time t721, at which the PM deposition amount Pr is equal to or less than the second predetermined amount, the filter regeneration control ends, as shown in FIG. 7E. Even after that, the operating state of the internal combustion engine continues. Therefore, as shown in FIG. 7B, the PM deposition amount Pr also increases with an increase of the first estimated amount PMf.

At a point in time t722, at which an adequate period of time passes since the point in time t721, the operating state of the internal combustion engine enters an operating region where the second estimated amount calculation unit 63 can calculate the second estimated amount PMc. Also, in this case, since determination is made that the differential pressure sensor 41 has an anomaly, the PM deposition amount calculation unit 64 calculates the first estimated amount PMf as the PM deposition amount Pr.

Thereafter, at a point in time t723, the ignition switch 47 is switched from the ON state to the OFF state. Then, the internal combustion engine enters a stopped state.

In the present embodiment, when it is determined that the differential pressure sensor 41 is normal and the accuracy of the second estimated amount PMc is guaranteed, the correction process is performed. When it is determined that the differential pressure sensor 41 has an anomaly and the accuracy of the second estimated amount PMc is not guaranteed, the correction process is not performed. Therefore, when the first estimated amount PMf is corrected based on the second estimated amount PMc, the corrected first estimated amount PMf reflects the actual PM deposition amount rather than the uncorrected first estimated amount PMf.

The present embodiment may be modified as follows. Further, the present embodiment and the following modifications can be combined as long as the combined modifications remain technically consistent with each other.

In the above embodiment, when it is determined that the differential pressure sensor 41 has an anomaly, the PM deposition amount calculation unit 64 calculates the first estimated amount PMf as the PM deposition amount Pr. Alternatively, even when it is determined that the differential pressure sensor 41 has an anomaly, if the operation is in the operating region where the second estimated amount calculation unit 63 calculates the second estimated amount PMc, the PM deposition amount calculation unit 64 may calculate, as the PM deposition amount Pr, the larger value of the first estimated amount PMf and the second estimated amount PMc.

In the above embodiment, the correction processing unit 73 executes the correction process when the differential pressure sensor 41 is determined to be normal, and refrains from executing the correction process when the differential pressure sensor 41 is determined to have an anomaly. Alternatively, the correction process may be executed when the differential pressure sensor 41 is determined to have an anomaly. For example, in a case where execution time of the anomaly determination and starting time of the correction process in the anomaly determination unit 72 are close to each other, the starting time of the correction process may arrive before the differential pressure sensor 41 is determined to have an anomaly and then, the information reaches the correction processing unit 73. In this case, the correction process may be performed after the anomaly determination of the differential pressure sensor 41 is made.

In the above embodiment, when performing the decreasing correction on the first estimated amount PMf, the correction processing unit 73 sets an upper limit for the correction amount by the single correction process, but the upper limit is not necessarily set. In this case, in order to obtain an appropriate value for eliminating the deviation $\Delta PM$, a calculation may be performed so that the smaller the deviation $\Delta PM$, the larger the correction amount.

The correction amount when the decreasing correction is performed on the first estimated amount PMf is calculated based on the deviation $\Delta PM$, but may be a fixed value regardless of the deviation $\Delta PM$.

When the decreasing correction is performed on the first estimated amount PMf, the correction amount calculated based on the deviation $\Delta PM$ is subtracted from the first estimated amount PMf, but the present disclosure is not limited thereto. For example, instead of calculating the correction amount based on the deviation $\Delta PM$, a deviation $\Delta PM$ ($\Delta PM<0$) may be added to the first estimated amount PMf. With this configuration, when the decreasing correction is performed on the first estimated amount PMf, the value of the corrected first estimated amount PMf may be equalized with the second estimated amount PMc by the single correction process.

In the above embodiment, in a case where the increasing correction is performed on the first estimated amount PMf, the correction processing unit 73 adds the deviation $\Delta PM$ to the first estimated amount PMf to equalize the value of the corrected first estimated amount PMf with the second estimated amount PMc. Alternatively, in order to make the value of the corrected first estimated amount PMf equal to the value of the second estimated amount PMc, a correction amount based on the deviation $\Delta PM$ may be calculated, the correction amount may be added to the first estimated amount PMf or may be multiplied.

In the above embodiment, in a case where the increasing correction is performed on the first estimated amount PMf, the correction processing unit 73 equalize the value of the corrected first estimated amount PMf with the second estimated amount PMc by the single correction process. Alternatively, when the increasing correction is performed on the first estimated amount PMf, if the correction process is executed a number of times, the value of the corrected first estimated amount PMf may be increased to be equal to the second estimated amount PMc. In this case, the correction amount in the increasing correction may be calculated based on the deviation $\Delta PM$, and the upper limit may be set to the correction amount. According to this configuration, the upper limit of the correction amount is set to be smaller than a correction amount required to eliminate the discrepancy by the deviation $\Delta PM$. That is, the correction amount by the single correction process is set to be smaller than the required correction amount. With this, the value of the corrected first estimated amount PMf is prevented from increasing to be equal to the second estimated amount PMc by the single correction process. Further, by setting a fixed value smaller than the deviation $\Delta PM$ as the correction amount, it is possible to eliminate a need of increasing the value of the corrected first estimated amount PMf to be equal to the second estimated amount PMc by the single correction process.

In the above embodiment, the correction processing unit 73 corrects the value of the first estimated amount PMf so as to be equalized with the second estimated amount PMc. That is, a value equal to the second estimated amount PMc is set as the target value of the corrected first estimated amount PMf. Alternatively, the correction processing unit 73 may set a value larger or smaller than the second estimated amount PMc as the target value of the corrected first estimated amount PMf in the correction processing unit 73. In this case, if a limit is set to the target value of the first estimated amount PMf, it is also possible to set the upper limit or the lower limit to the correction degree when the first estimated amount PMf is corrected by the correction process. That is, if the level of correction is limited, the value of the corrected first estimated amount PMf can be limited to a predetermined range.

In the above embodiment, the correction processing unit 73 performs the correction process based on the deviation $\Delta PM$ stored when the internal combustion engine is in the operating state, before the internal combustion engine was started. The deviation $\Delta PM$ is not limited to that stored before the internal combustion engine is started. For example, if the second estimated amount PMc can be calculated in a period after the startup of the internal combustion engine to the start of the correction process, the correction process may be executed by using the deviation $\Delta PM$ between the second estimated amount PMc and the first estimated amount PMf.

In the operating region in which the intake air amount Ga flowing into the engine main body, that is, the flow rate of the exhaust gas is sufficient, the differential pressure $\Delta P$ is correspondingly large, and the engine rotational speed NE changes only slightly and is stable, the second estimated amount calculation unit 63 calculates the second estimated amount PMc based on the differential pressure ΔP detected by the differential pressure sensor 41. Alternatively, the second estimated amount calculation unit 63 may calculate the second estimated amount PMc regardless of the operating state of the internal combustion engine. In this case, the deviation storage unit 65 desirably stores the deviation ΔPM in a state where the accuracy of the second estimated amount PMc calculated by the second estimated amount calculation unit 63 can be guaranteed.

In the above embodiment, when the first estimated amount PMf is larger than the second estimated amount PMc, the decreasing correction is performed on the first estimated amount PMf by the correction process, but the present disclosure is not limited to this. For example, when the first estimated amount PMf is larger than the second estimated amount PMc, the increasing correction may be performed on the first estimated amount PMf by the correction process if it is necessary for correcting the value to a value close to the actual PM deposition amount. Further, in the above embodiment, when the first estimated amount PMf is smaller than the second estimated amount PMc, the increasing correction is performed on the first estimated amount PMf by the correction process, but the present disclosure is not limited to this. For example, also when the first estimated amount PMf is smaller than the second estimated amount PMc, the decreasing correction may be performed on the first estimated amount PMf by the correction process if it is necessary for correcting the value to a value close to the actual PM deposition amount.

In the above embodiment, when the decreasing correction is performed on the first estimated amount PMf, the level of correction of the first estimated amount PMf is set to be smaller than that when the increasing correction is performed. Alternatively, when the decreasing correction of the first estimated amount PMf is performed, the level of correction of the first estimated amount PMf may be set larger than that when the increasing correction is performed, or the levels may be set equally.

The anomaly determination unit 72 makes the anomaly determination of the differential pressure sensor 41 based on the learned value learned by the reference point learning unit 71, but the present disclosure is not limited thereto. The anomaly determination unit 72 may suffice to perform the anomaly determination of the differential pressure sensor 41 based on the situation of the differential pressure sensor 41 during the period from stopping of the internal combustion engine to the startup, and for example, may perform the anomaly determination by comparing the output voltage of the differential pressure sensor 41 in the period from stopping of the internal combustion engine to the startup thereof, with the determined value.

In the above embodiment, the anomaly determination unit 72 performs the anomaly determination at the time of starting the internal combustion engine whose ignition switch 47 is switched from the OFF state to the ON state, but the present disclosure is not limited thereto. At time later than the time when the internal combustion engine is started, or when the internal combustion engine is stopped, the anomaly determination unit 72 may perform the anomaly determination of the differential pressure sensor 41.

In the above embodiment, when the operation is no longer in the operating region where the second estimated amount calculation unit 63 calculates the second estimated amount PMc after the operating region is entered where the second estimated amount PMc is calculated by the second estimated amount calculation unit 63, the PM deposition amount calculation unit 64 calculates the PM deposition amount Pr based on the deviation ΔPM stored in the deviation storage unit 65 and the first estimated amount PMf calculated by the first estimated amount calculation unit 62. Alternatively, when the operation is no longer in the operating region where the second estimated amount calculation unit 63 calculates the second estimated amount PMc after the operating region is entered where the second estimated amount PMc is calculated by the second estimated amount calculation unit 63, the PM deposition amount calculation unit 64 may regard the first estimated amount PMf as the PM deposition amount Pr, irrespective of the deviation ΔPM.

In the above embodiment, the differential pressure sensor is configured by the exhaust differential pressure detection unit 42, the upstream side detection passage 43, and the downstream side detection passage 44. Alternatively, the downstream side detection passage 44 of the differential pressure sensor may be opened to the atmosphere without being connected to the third exhaust pipe 25. In this case, the pressure on the downstream side of the PM filter 31 is regarded as the atmospheric pressure, and the differential pressure of the PM filter 31 is detected. Further, the differential pressure sensor may be configured by a first pressure sensor configured to detect a pressure at the upstream side of the PM filter 31 and a second pressure sensor configured to detect a pressure at the downstream side of the PM filter 31, where a differential pressure of the PM filter 31 is detected based on the difference in detection signal between the first pressure sensor and the second pressure sensor.

In the above embodiment, the control device 60 executes the filter regeneration control and the correction process by a CPU executing a program stored in a ROM. That is, the exhaust purification device 100 of the internal combustion engine includes a program storage device such as a ROM configured to store all programs for executing the filter regeneration control and the correction process, and a processing device such as a CPU configured to execute a process according to the programs, where a software process is executed to execute the filter regeneration control and the correction process. Thus, the exhaust purification device 100 of the internal combustion engine is not limited only to that configured to perform each of the various types of controls only by the software process. For example, the exhaust purification device 100 may include a dedicated hardware circuit configured to execute at least a part of the software processes executed in the above embodiment. This configuration can be realized, for example, by including a processing device and a program storage device configured to execute a part of the processes executed in the above embodiment according to a program, and a dedicated hardware circuit configured to execute the remaining processes. Further, for example, this configuration can also be realized by including a dedicated hardware circuit configured to execute all the processes executed in the above embodiment. In this manner, a process required for each of the various types of controls may be executed by a processing circuit including at least either one of one or a plurality of software processing circuits, and one or a plurality of dedicated hardware circuits.

Therefore, the present examples and embodiments are to be considered as illustrative and not restrictive and the disclosure is not to be limited to the examples and embodiments given herein.

The invention claimed is:

1. An exhaust purification device for an internal combustion engine, comprising:

an exhaust passage, from which exhaust gas from the internal combustion engine is discharged;

a PM filter provided in the exhaust passage and configured to trap PM contained in the exhaust gas; and a differential pressure sensor configured to detect a differential pressure between an upstream side and a downstream side of the PM filter, wherein the exhaust purification device includes a control device including a processor, the control device being configured to calculate a first estimated amount as an estimated amount of PM deposited in the PM filter based on an operating state of the internal combustion engine, calculate a second estimated amount as an estimated amount of PM deposited in the PM filter based on a differential pressure detected by the differential pressure sensor, perform an anomaly determination of the differential pressure sensor based on a state of the differential pressure sensor in a period from stopping of the internal combustion engine to a startup thereof, when starting the internal combustion engine, execute a correction process to correct the first estimated amount based on the second estimated amount, calculate, as a PM deposition amount, the larger value of the first estimated amount and the second estimated amount, and start a filter regeneration control for burning and removing PM trapped in the PM filter when the PM deposition amount is equal to or more than a predetermined amount.

2. The exhaust purification device for the internal combustion engine according to claim 1, wherein the control device is configured to perform, when the first estimated amount is larger than the second estimated amount, a decreasing correction on the first estimated amount by the correction process; perform, when the first estimated amount is smaller than the second estimated amount, an increasing correction on the first estimated amount by the correction process; and decrease a level of correction of the first estimated amount when the decreasing correction is performed than that when the increasing correction is performed.

3. The exhaust purification device for the internal combustion engine according to claim 2, wherein the control device is configured to correct, when performing the increasing correction on the first estimated amount, a value of the first estimated amount such that the first estimated amount is equalized with the second estimated amount by a single correction process.

4. The exhaust purification device for the internal combustion engine according to claim 2, wherein the control device is configured to set, when performing a decreasing correction on the first estimated amount, an upper limit of a correction amount of the first estimated amount to be corrected by a single correction process.

5. The exhaust purification device for the internal combustion engine according to claim 1, wherein the control device is configured to execute the correction process when it is determined by the anomaly determination that the differential pressure sensor is normal, and refrain from executing the correction process when it is determined that the differential pressure sensor has an anomaly.

6. An exhaust purification device for an internal combustion engine, comprising:

an exhaust passage, from which exhaust gas from the internal combustion engine is discharged;

a PM filter provided in the exhaust passage and configured to trap PM contained in the exhaust gas; and a differential pressure sensor configured to detect a differential pressure between an upstream side and a downstream side of the PM filter, wherein the exhaust purification device includes a control device including a processor and a memory, the processor executing program stored in the memory, the program including:

calculating a first estimated amount as an estimated amount of PM deposited in the PM filter based on an operating state of the internal combustion engine, calculating a second estimated amount as an estimated amount of PM deposited in the PM filter based on a differential pressure detected by the differential pressure sensor, performing an anomaly determination of the differential pressure sensor based on a state of the differential pressure sensor in a period from stopping of the internal combustion engine to a startup thereof, when starting the internal combustion engine, executing a correction process to correct the first estimated amount based on the second estimated amount, calculating, as a PM deposition amount, the larger value of the first estimated amount and the second estimated amount, and starting a filter regeneration control for burning and removing PM trapped in the PM filter when the PM deposition amount is equal to or more than a predetermined amount.

7. A method for controlling an exhaust purification device for an internal combustion engine, wherein the exhaust purification device includes an exhaust passage, from which exhaust gas from the internal combustion engine is discharged, a PM filter provided in the exhaust passage and configured to trap PM contained in the exhaust gas, and a differential pressure sensor configured to detect a differential pressure between an upstream side and a downstream side of the PM filter, the method comprising:

calculating a first estimated amount as an estimated amount of PM deposited in the PM filter based on an operating state of the internal combustion engine;

calculating a second estimated amount as an estimated amount of PM deposited in the PM filter based on a differential pressure detected by the differential pressure sensor;

performing an anomaly determination of the differential pressure sensor based on a state of the differential pressure sensor in a period from stopping of the internal combustion engine to a startup thereof;

when starting the internal combustion engine, executing a correction process to correct the first estimated amount based on the second estimated amount;

calculating, as a PM deposition amount, the larger value of the first estimated amount and the second estimated amount; and starting a filter regeneration control for burning and removing PM trapped in the PM filter when the PM deposition amount is equal to or more than a predetermined amount.

* * * * *